US012643739B2

(12) United States Patent
Ito

(10) Patent No.: US 12,643,739 B2
(45) Date of Patent: Jun. 2, 2026

(54) STORAGE SHELF AND TRANSPORT VEHICLE SYSTEM

(71) Applicant: MURATA MACHINERY, LTD., Kyoto (JP)

(72) Inventor: Yasuhisa Ito, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 692 days.

(21) Appl. No.: 18/106,519

(22) Filed: Feb. 7, 2023

(65) Prior Publication Data

US 2023/0257198 A1 Aug. 17, 2023

(30) Foreign Application Priority Data

Feb. 17, 2022 (JP) ................................. 2022-022735

(51) Int. Cl.
*B65G 1/10* (2006.01)
*B65G 1/04* (2006.01)
*B65G 1/137* (2006.01)

(52) U.S. Cl.
CPC ............. *B65G 1/10* (2013.01); *B65G 1/0464* (2013.01); *B65G 1/137* (2013.01)

(58) Field of Classification Search
CPC ......... B65G 1/10; B65G 1/0464; B65G 1/137
See application file for complete search history.

(56) References Cited

U.S. PATENT DOCUMENTS

| | | | | |
|---|---|---|---|---|
| 2006/0072987 A1* | 4/2006 | Hoshino | .............. | B65G 1/0457 |
| | | | | 414/277 |
| 2006/0230975 A1* | 10/2006 | Shiwaku | ................... | B61B 1/00 |
| | | | | 104/88.01 |
| 2016/0289001 A1* | 10/2016 | Shibata | ............. | H01L 21/67733 |
| 2018/0274259 A1* | 9/2018 | Shinnaka | .............. | B65G 1/137 |
| 2022/0048709 A1* | 2/2022 | Valinsky | .............. | B65G 1/0464 |
| 2023/0028034 A1* | 1/2023 | Gravelle | .............. | B65G 1/0485 |
| 2023/0052015 A1* | 2/2023 | Lee | ................... | H01L 21/67733 |
| 2023/0118995 A1* | 4/2023 | Ito | ..................... | H01L 21/67727 |
| | | | | 700/218 |
| 2023/0170237 A1* | 6/2023 | Ito | ..................... | H01L 21/67736 |
| | | | | 414/496 |
| 2023/0170238 A1* | 6/2023 | Ito | .......................... | B66C 19/00 |
| | | | | 212/328 |

(Continued)

FOREIGN PATENT DOCUMENTS

| | | | |
|---|---|---|---|
| JP | 59-22801 A | 2/1984 |
| JP | 62-297050 A | 12/1987 |

(Continued)

*Primary Examiner* — Saul Rodriguez
*Assistant Examiner* — Ashley K Romano
(74) *Attorney, Agent, or Firm* — Keating & Bennett, LLP

(57) ABSTRACT

A storage shelf includes a body and a pair of storage portions in the body and facing each other across a predetermined area. The pair of storage portions includes a shelf plate movable with respect to the body and to support an article, a guide extending in a facing direction of the pair of storage portions to guide movement of the movable shelf plate, a driver to move the movable shelf plate along the extending direction of the guide, and a drive controller to control the driver. The guides facing each other in the pair of storage portions are connected by a connector in the area, and the connector guides the movement of the movable shelf plate to the area.

8 Claims, 14 Drawing Sheets

(56)        References Cited

U.S. PATENT DOCUMENTS

2023/0242166 A1 *   8/2023   Matsumoto ....... H01L 21/67724
                                            246/28 R

FOREIGN PATENT DOCUMENTS

| | | | |
|---|---|---|---|
| JP | 06-144520 | A | 5/1994 |
| JP | 2005-289588 | A | 10/2005 |
| JP | 2016-064903 | A | 4/2016 |
| JP | 2020-066499 | A | 4/2020 |
| WO | 2019/021708 | A1 | 1/2019 |

* cited by examiner

STORAGE SHELF AND TRANSPORT VEHICLE SYSTEM

CROSS REFERENCE TO RELATED APPLICATIONS

This application claims the benefit of priority to Japanese Patent Application No. 2022-022735 filed on Feb. 17, 2022. The entire contents of this application are hereby incorporated herein by reference.

BACKGROUND OF THE INVENTION

1. Field of the Invention

The present invention relates to a storage shelf and a transport vehicle system.

2. Description of the Related Art

For example, in a factory or the like that manufactures semiconductor products, an overhead transport vehicle that transports an article along a rail provided on a ceiling may be used, and a storage shelf for temporarily storing the article transported by the overhead transport vehicle may be provided. For example, Japanese Unexamined Patent Publication No. 2020-66499 discloses a storage shelf (a ceiling hanging shelf) hung from a ceiling. This storage shelf is formed of two shelves, a shelf that can be transferred laterally from the overhead transport vehicle and a sliding shelf that can be transferred downward. Further, for example, Japanese Unexamined Patent Publication No. 62-297050 discloses a storage shelf (a rack) installed on a floor. The storage shelf includes a plurality of movable shelf plates (sliding shelves), which advance from a storage part, at a position where downward transfer from the overhead transport vehicle is possible.

However, in the conventional storage shelf described above, when the movable shelf plate advances from the storage part to a position where downward transfer from the overhead transport vehicle is possible, that is, a position below the overhead transport vehicle, deflection may occur in the storage shelf. In addition, due to the recent trend toward increased throughput, storage shelves capable of storing a larger number of articles are desired.

SUMMARY OF THE INVENTION

Therefore, preferred embodiments of the present invention provide storage shelves and transport vehicle systems each capable of increasing a number of articles stored and reducing an amount of deflection that occurs when a movable shelf plate advances from a storage portion.

A storage shelf according to one aspect of a preferred embodiment of the present invention is a storage shelf to which an article is transferrable by an overhead transport vehicle that travels along a rail, the storage shelf including a body, and a pair of storage portions in the body and facing each other across a predetermined area in a plan view as viewed from above in a vertical direction. Each of the pair of storage portions includes a movable shelf plate that is movable with respect to the body and is capable of supporting the article, a guide that extends in a facing direction of the pair of storage portions to guide movement of the movable shelf plate, a driver to move the movable shelf plate along an extending direction of the guide, and a drive controller to control the driver. The guides facing each other in the pair of the storage portions are connected by a connector in the area to guide the movement of the movable shelf plate to the area.

In the storage shelf having this configuration, the guides facing each other in the pair of storage portions are connected in the area, so that the movable shelf plate can advance to the area along the extending direction of the guide. As a result, the pair of storage portions are configured to support each other via the guide, and hence it is possible to reduce the amount of deflection that occurs when the movable shelf plate advances from the storage portion as compared with a configuration in which the movable shelf plate advances from the portion in a cantilevered manner.

In a storage shelf according to one aspect of a preferred embodiment of the present invention, the driver and the drive controller may be provided on the movable shelf plate, and the movable shelf plate is detachable from the body. With this configuration, the movable shelf plate, the driver, and the drive controller are integrally configured as one unit. As a result, for example, when the driver or the drive controller fails, it is possible to repair the defective movable shelf plate by a simple work of removing the movable shelf plate to which the failed driver or drive controller is attached from the body and attaching a new movable shelf plate with a normal driver and drive controller to the body.

In a storage shelf according to one aspect of a preferred embodiment of the present invention, the connector may be retractable from the area. In the storage shelf having this configuration, although it is difficult for an operator to freely move in the area because the connector is disposed in the area under normal use, with this configuration, the connector placed in the area can be removed. Thus, by removing the connector, the operator can freely move the area.

A storage shelf according to one aspect of a preferred embodiment of the present invention may further include a hung storage portion including a hung portion hung from a ceiling of a building in which the storage shelf is installed, and a fixed shelf plate immovably attached to the hung part, and a leg to support the body on a floor surface of the building. The storage portion may be below the hung storage portion. With this configuration, an article can be selectively placed on two types of placement places, the fixed shelf plate and the movable shelf plate, according to the situation. Even when the hung storage portion is already installed, only the body can be additionally installed under the existing hung storage portion, and the amount of storage can be increased using the lower portion of the hung storage portion.

A storage shelf according to one aspect of a preferred embodiment of the present invention may further include, in the body, a hung portion to be hung from a ceiling of a building in which the storage shelf is installed. The storage portion further includes a fixed shelf plate that is immovable with respect to the body and capable of supporting the article. The movable shelf plate may be below the fixed shelf plate in the vertical direction. With this configuration, the configuration of the storage shelf is simple, so that it is possible to manufacture the storage shelf at low cost and it is easy to assemble the storage shelf. In addition, there is no need to install a storage shelf on the floor surface, thus widening an area where the operator can freely move and improving workability.

A storage shelf according to one aspect of a preferred embodiment of the present invention may further include, in the body, a leg on a floor surface of a building in which the storage shelf is installed. The storage portion further includes a fixed shelf plate that is immovable with respect to the body and capable of supporting the article, and the movable shelf plate may be below the fixed shelf plate in the vertical direction. With this configuration, the configuration of the storage shelf is simple, so that it is possible to manufacture the storage shelf at low cost and it is easy to assemble the storage shelf. Further, it is possible to stably support the storage shelf and to increase the amount of storage of articles even in a building having a ceiling with such strength that a ceiling hanging shelf cannot be installed. Moreover, for example, the storage shelf assembled in a factory or the like can be taken to a site where the storage shelf is to be installed and installed. This can minimize work on site at the time of installation.

A transport vehicle system according to one aspect of a preferred embodiment of the present invention may include the storage shelf described above, and an overhead transport vehicle to travel along a rail. With this configuration, the bending of the storage shelf is reduced when the article is transferred from the overhead transport vehicle to the storage part, so that the article can be reliably transferred from the overhead transport vehicle.

In a transport vehicle system according to one aspect of a preferred embodiment of the present invention, the overhead transport vehicle may further include a first communicator to perform communication with the storage shelf. The storage shelf may further include a second communicator to perform communication with the overhead transport vehicle. The first communicator may transmit an identification signal to identify one of the movable shelf plates. When receiving the identification signal via the second communicator, the drive controller may control the driver corresponding to the movable shelf plate identified so that the movable shelf plate identified by the identification signal advances to the area. With this configuration, the movable shelf plate can be moved by communication between the transport vehicle and the storage shelf without the need for the host controller.

In a transport vehicle system according to one aspect of a preferred embodiment of the present invention, the overhead transport vehicle may include a transfer mechanism to transfer the article in a direction intersecting the vertical direction. With this configuration, it is possible to provide a fixed shelf plate on which an article can be placed only by lateral transfer.

A transport vehicle system according to one aspect of a preferred embodiment of the present invention may further include the storage shelf described above, and an overhead transport vehicle to travel along a rail. The overhead transport vehicle may further include a first communicator to perform communication with the storage shelf, and a transfer mechanism to transfer the article in a direction intersecting the vertical direction. The storage shelf may further include a second communicator to enable communication with the overhead transport vehicle. When the overhead transport vehicle transfers the article to the fixed shelf plate, the overhead transport vehicle may transfer the article in the direction intersecting the vertical direction by the transfer mechanism without transmitting an identification signal to identify one of the movable shelf plates from the first communicator. When the overhead transport vehicle transfers the article to the movable shelf plate, the drive controller is configured or programmed to receive the identification signal transmitted from the first communicator via the second communicator and transfer the article to the movable shelf plate after the movable shelf plate identified from the identification signal is advanced to the area. With this configuration, the movable shelf plate can be moved to transfer the article to the movable shelf plate by communication between the transport vehicle and the storage shelf without the need for the host controller, and the article can be transferred to the fixed shelf plate in a shorter time without communication between the transport vehicle and the storage shelf.

According to preferred embodiments of the present invention, it is possible to increase the number of articles stored and to reduce the amount of deflection that occurs when the movable shelf plate moves out of the overhead transport vehicle.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a schematic plan view illustrating a transport vehicle system according to a preferred embodiment of the present invention.

FIG. 11 is a front view of a storage shelf according to Alternative Preferred Embodiment 1 of the present invention as viewed from the front.

DETAILED DESCRIPTION OF THE PREFERRED EMBODIMENTS

Figure 2:
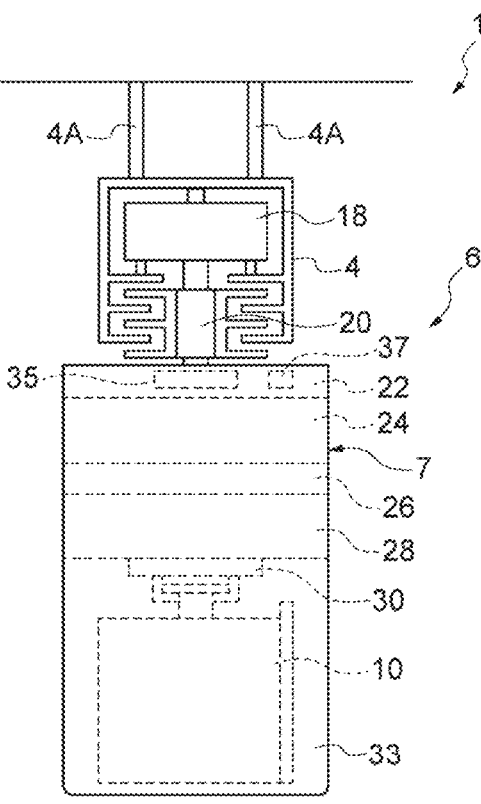
FIG. 2 is a front view of the transport vehicle in FIG. 1 as viewed from the front.

Hereinafter, storage shelves and transport vehicle systems including the storage shelves according to preferred embodiments of the present invention will be described with reference to the drawings. In descriptions of the drawings, the same elements are provided with the same reference numerals, and a repeated description is omitted.

Figure 1:
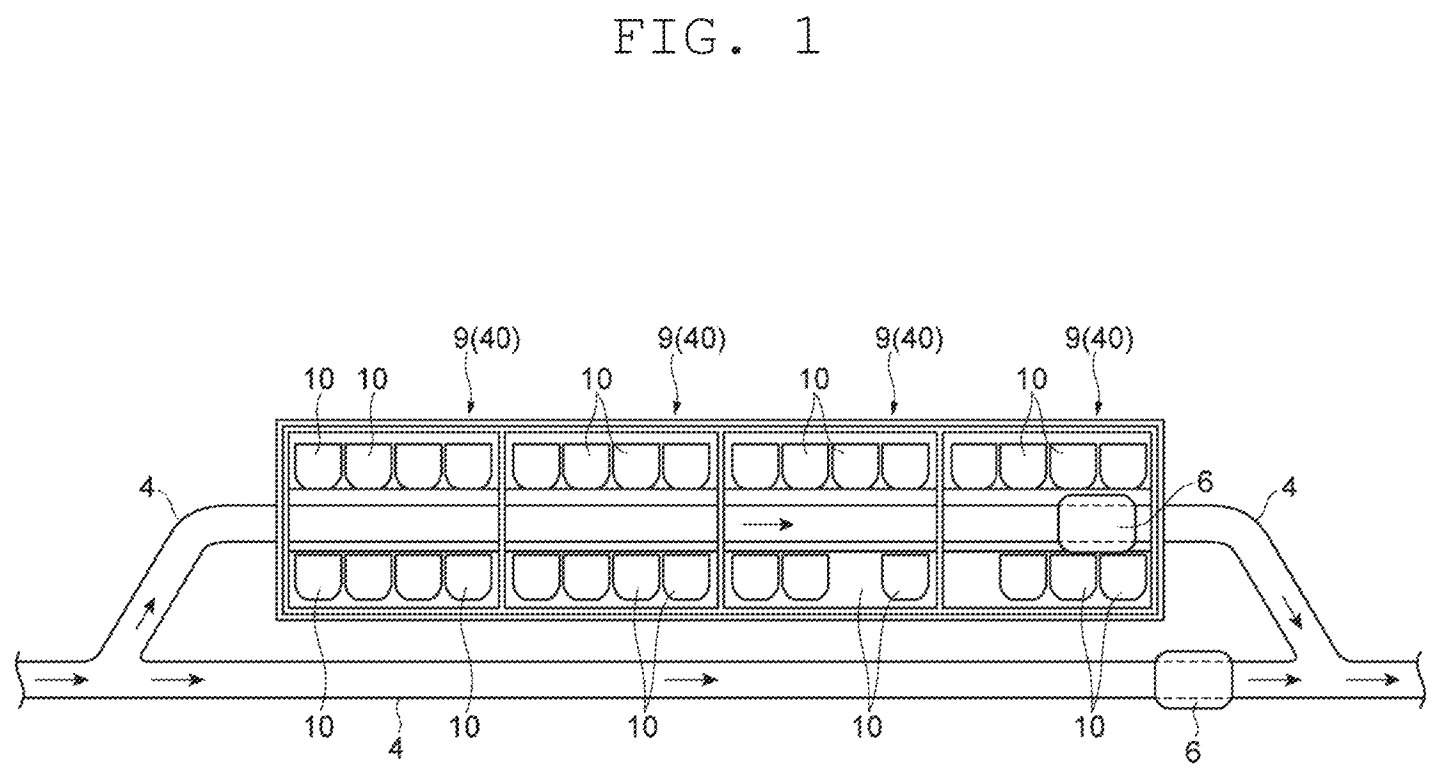

As illustrated in FIGS. 1 and 2, a transport vehicle system 1 of the present preferred embodiment is a system to transport an article 10 (cf. FIG. 2) between placement parts 9, 9 using, for example, an overhead transport vehicle 6 movable along a track (a rail) 4. The article 10 includes, for example, a container such as a front opening unified pod (FOUP) that stores a plurality of semiconductor wafers and a reticle pod that stores a glass substrate, general components, and the like. Here, for example, a transport vehicle system 1 in which an overhead transport vehicle 6 (hereinafter simply referred to as a "transport vehicle 6") travels along a one-way track 4 on a ceiling or the like of a factory in a factory or the like will be described as an example. As illustrated in FIG. 1, the transport vehicle system 1 includes the track 4, the placement part 9, and a plurality of transport vehicles 6.

The track 4 is located, for example, near the ceiling, which is an overhead space of an operator. The track 4 is hung from, for example, the ceiling. The track 4 is a predetermined traveling path to cause the transport vehicle 6 to travel. The track 4 is supported by the columns 4A, 4A.

The transport vehicle 6 travels along the track 4 and transports the article 10. The transport vehicle 6 is configured to be able to transfer the article 10. The transport vehicle 6 is an overhead traveling automated transport vehicle. The number of transport vehicles 6 included in the transport vehicle system 1 is not particularly limited but is plural. The transport vehicle 6 includes a body 7, a traveling part 18, and a control part 35.

The body 7 includes a body frame 22, a lateral transfer part (transfer mechanism) 24, a θ drive 26, a lift drive part 28, a lift stage 30, and a fall prevention cover 33. The traveling part 18 includes a motor and the like and causes the transport vehicle 6 to travel along the track 4. The traveling part 18 includes, for example, a power receiving communication part 20 that receives power from the track 4 side by wireless power transfer.

The lateral transfer part 24 laterally transfers the θ drive 26, the lift drive part 28, and the lift stage 30 all at once in a direction perpendicular to the traveling direction of the track 4. The θ drive 26 rotates at least one of the lift drive part 28 and the lift stage 30 within a predetermined angle range in a horizontal plane. The lift drive part 28 lifts and lowers the lift stage 30 by winding or feeding a hanging material such as a wire, a rope, and a belt. The lift stage 30 is provided with a chuck and can freely hold or release the article 10. For example, a pair of fall prevention covers 33 are provided in front of and behind the transport vehicle 6 in the traveling direction. The fall prevention cover 33 causes a claw or the like (not illustrated) to protrude and retract below the article 10 to be transported, thus preventing the article 10 from falling during transport.

The control part 35 is an electronic control unit including a central processing unit (CPU), a read-only memory (ROM), a random-access memory (RAM), and the like. The control part 35 controls various operations in the transport vehicle 6. Specifically, the control part 35 controls the traveling part 18, the lateral transfer part 24, the θ drive 26, the lift drive part 28, and the lift stage 30. The control part 35 can be configured as, for example, software in which a program stored in the ROM is loaded onto the RAM and executed by the CPU. The control part 35 may be configured as hardware including an electronic circuit or the like.

The placement part 9 is disposed along the track 4 and is provided at a position where the article 10 can be delivered to and received from the transport vehicle 6. The placement part 9 includes a buffer and a delivery port. In the buffer, the article 10 is placed temporarily. In the buffer, for example, the article 10 is temporarily placed when the article 10 carried by the transport vehicle 6 cannot be transferred to the intended delivery port because, for example, another article 10 is placed in the intended delivery port. An example of the placement part 9 includes a storage shelf 40. The delivery port is a placement part to deliver and receive the article 10 to and from a semiconductor processing apparatus (not illustrated) including, for example, a cleaning apparatus, a film forming apparatus, a lithography apparatus, an etching apparatus, a heat treatment apparatus, and a flattening apparatus. Note that the processing apparatus is not particularly limited but may be various apparatuses.

Here, the storage shelf 40 includes a first storage shelf 40A and a second storage shelf 40B. The first storage shelf 40A is hung from the ceiling C of a building in which the storage shelf 40 is installed. The second storage shelf 40B is disposed below the first storage shelf 40A and is installed on the floor surface of the building in which the storage shelf 40 is installed.

Figure 3:
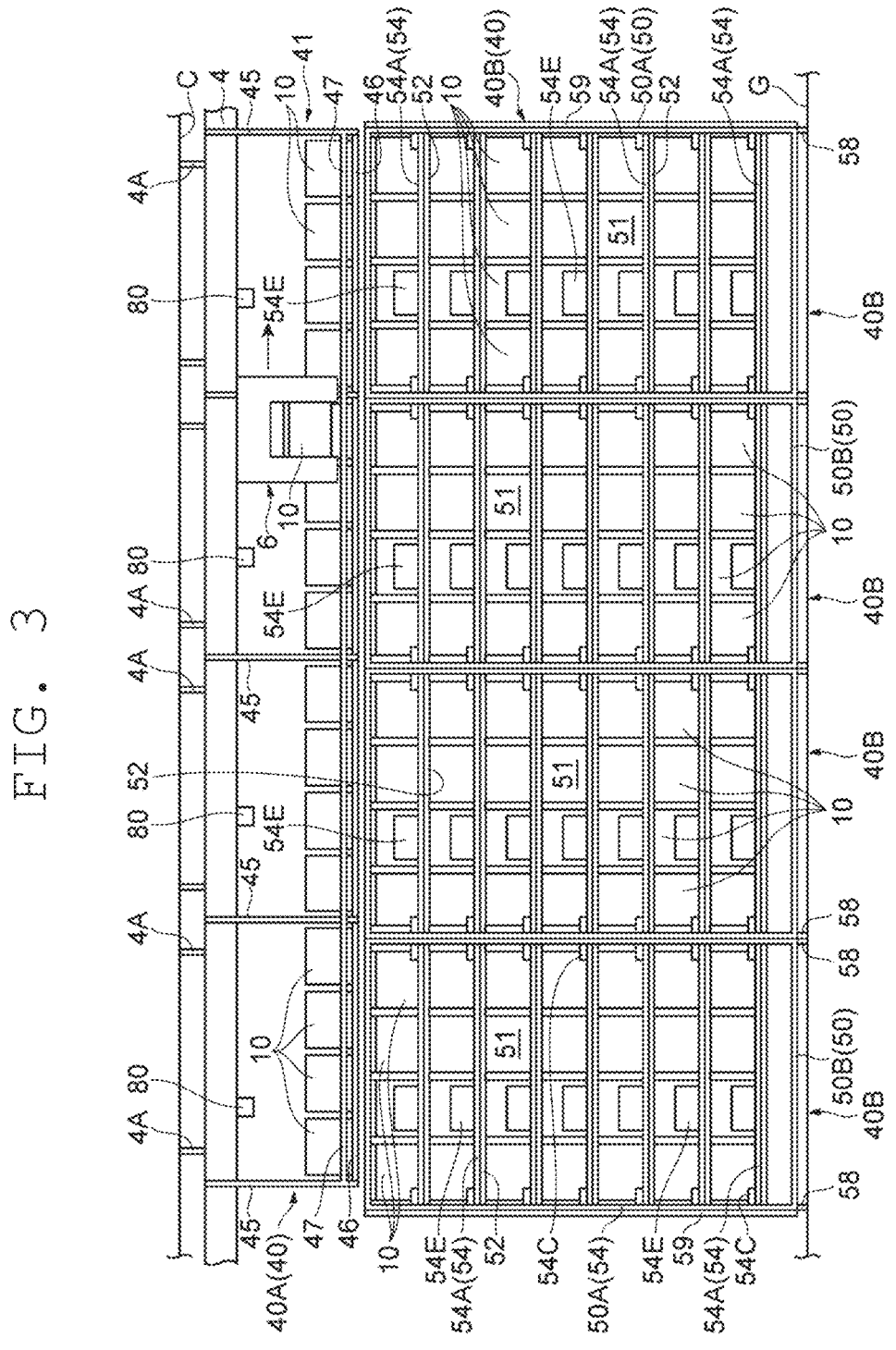
FIG. 3 is a front view of a first storage shelf and a second storage shelf in FIG. 1 as viewed from the front.
Figure 4:
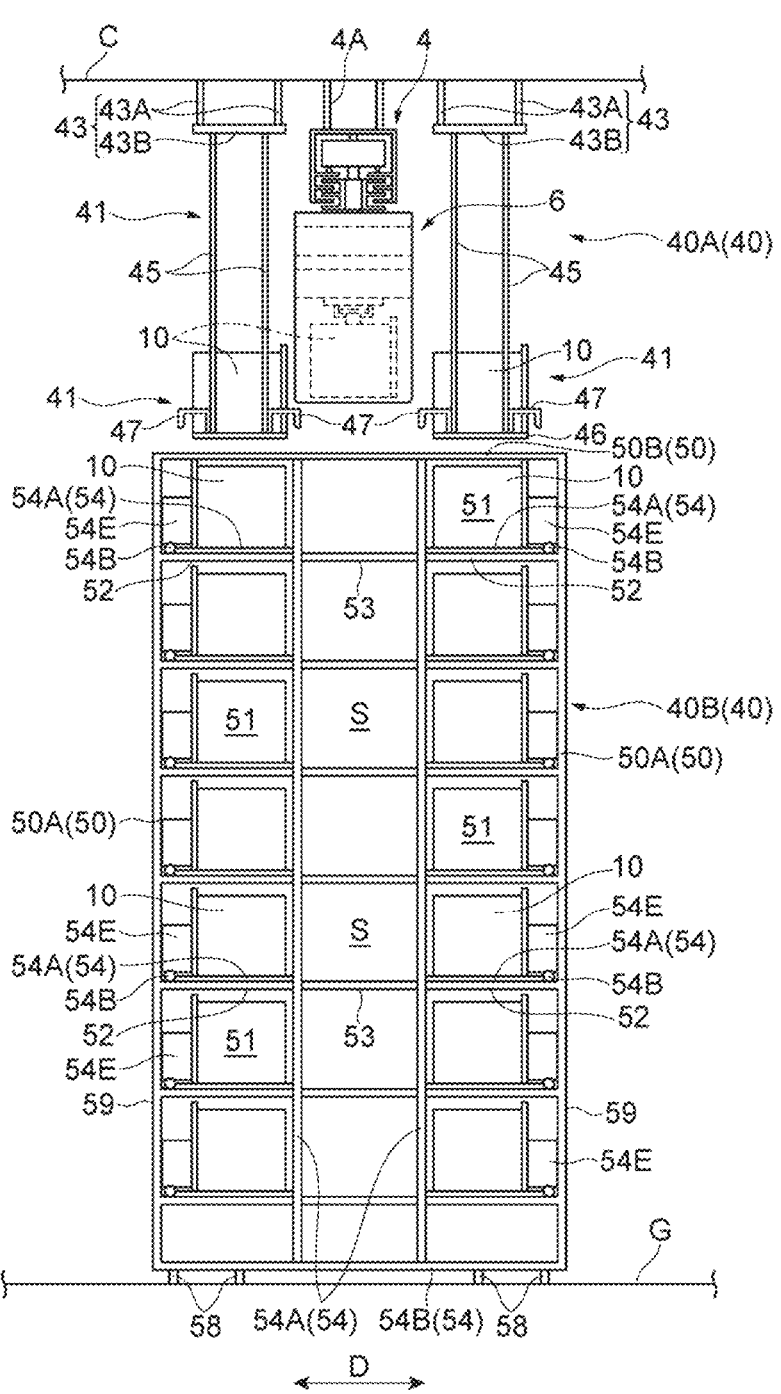
FIG. 4 is a side view of the first storage shelf and the second storage shelf in FIG. 1 as viewed from the side.
Figure 5A:
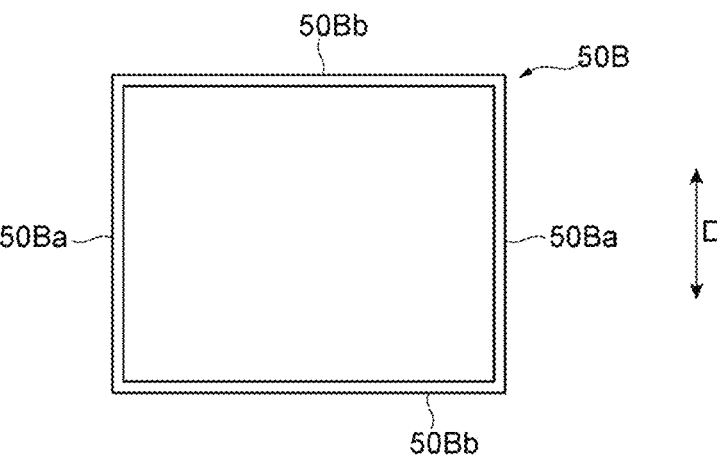
FIG. 5A is a plan view of a frame in a body.
Figure 5B:
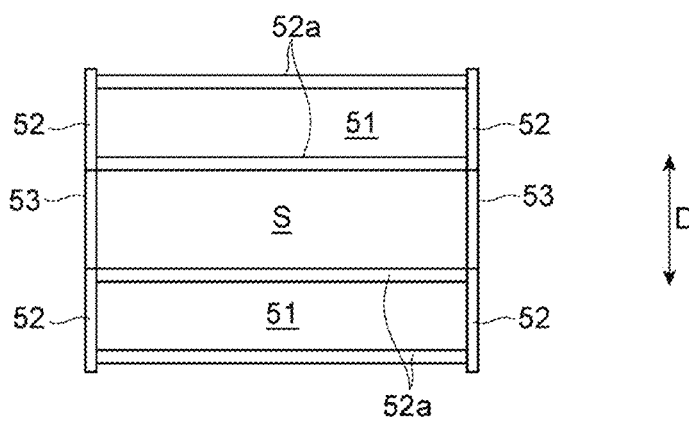
FIG. 5B is a plan view of the guide part.
Figure 5C:
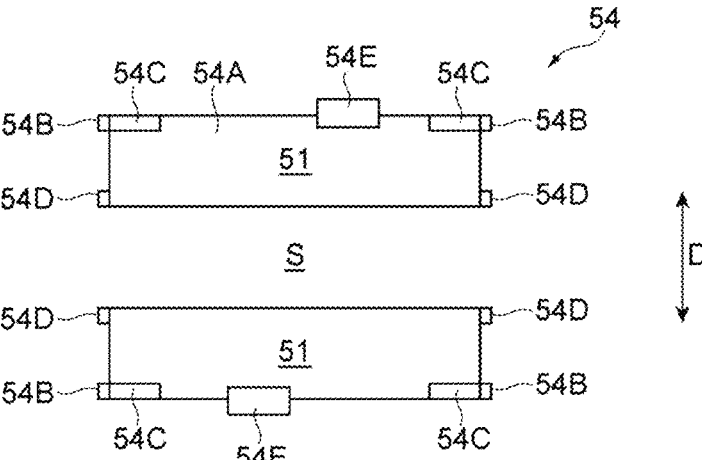
FIG. 5C is a plan view of the movable shelf plate.
Figure 6A:
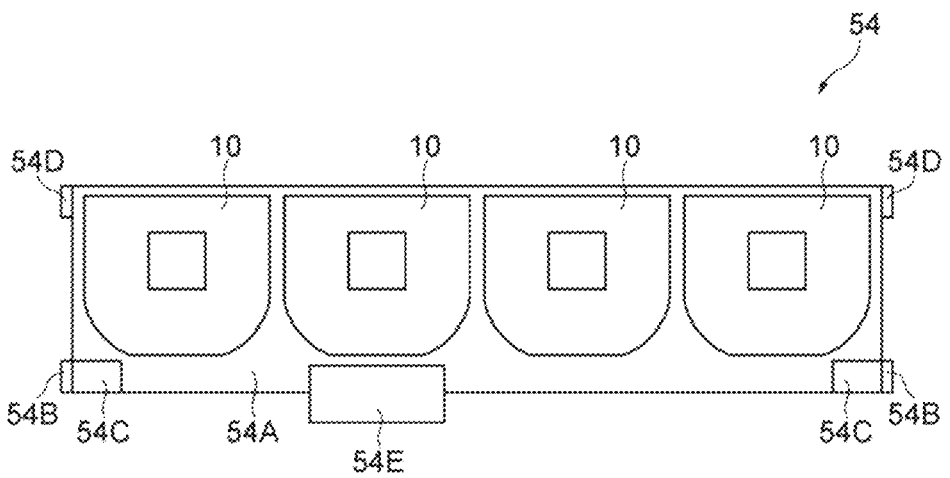
FIG. 6A is a detailed plan view of the movable shelf plate.
Figure 6B:
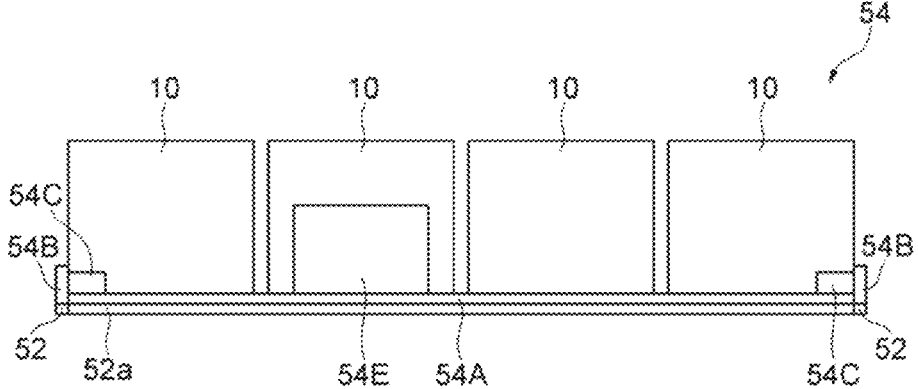
FIG. 6B is a detailed front view of the movable shelf plate.

As illustrated in FIGS. 3 and 4, the first storage shelf 40A is disposed on the side of the track 4 so as to sandwich the track 4 (the transport area of the transport vehicle 6 traveling on the track 4). The first storage shelf 40A includes a hung storage part 41 and a hung part 45. The hung storage part 41 is a portion that stores the article 10. The hung storage part 41 includes a fixed shelf plate 46 and a fall prevention fence 47. The fixed shelf plate 46 supports the article 10 from below. The fixed shelf plate 46 of the present preferred embodiment supports four articles 10, for example. The fixed shelf plate 46 is immovably attached to the hung part 45. The fall prevention fence 47 is disposed on the side of the article 10 supported by the fixed shelf plate 46 and prevents the article from falling from the fixed shelf plate 46. The fall prevention fence 47 extends along the track 4.

The hung part 45 is hung from the ceiling C of the building in which the first storage shelf 40A is installed via an attachment part 43. The hung parts 45 are arranged at equal or substantially equal intervals along the extending direction of the track 4. The attachment part 43 includes a fixing part 43A and a support part 43B attached to the ceiling C. The hung part 45 extends downward from the support part 43B. The transfer from the transport vehicle 6 to the first storage shelf 40A as described above is performed by laterally transferring the lift drive part 28 and the like by the lateral transfer part 24 and lifting and lowering the lift stage 30.

As illustrated in FIGS. 3 to 6, the second storage shelf 40B is disposed below the first storage shelf 40A. The second storage shelf 40B includes a body 50 and a storage part 51. In FIG. 3, of the body panel 59 attached so as to surround the side of the body 50, the display of a body panel 59 (cf. FIGS. 8 and 9) along the extending direction of the track 4 is omitted. In FIG. 4, of the body panels 59 attached so as to surround the body 50, the display of the body panel 59 (cf. FIGS. 8 and 9) orthogonal to the extending direction of the track 4 is omitted.

The body 50 includes columns 50A and a frame 50B. The columns 50A extend in the vertical direction and are arranged at least at four corners of the second storage shelf 40B. In the present preferred embodiment, four columns 50A are further disposed inside the four corners. The frame 50B is fixed to the upper end and the lower end of the eight columns 50A. The frame 50B includes first members 50Ba, 50Ba facing each other and second members 50Bb, 50Bb facing each other, and preferably has a quadrangular frame shape in a plan view as viewed from vertically above. Legs 58 are provided on a frame 50B provided at the lower end of the body 50, that is, the lower ends of the eight columns 50A, and the body 50 is installed on a floor surface G of the building.

The storage part 51 is a portion to store the article 10. The storage parts 51 are provided in the body 50 and are disposed to face each other across a predetermined area S in a plan view as viewed from above in the vertical direction. The area S overlaps the transport area of the transport vehicle 6 traveling on the track 4 in plan view. Each of the storage parts 51 includes a guide part 52, a movable shelf plate 54, a drive part 54C, and a drive control device 54E.

The guide part 52 extends in a facing direction D of the pair of storage parts 51, 51 and guides the movement of the movable shelf plate 54. More specifically, the guide part 52 includes rolling surfaces of a drive wheel 54B and the driven wheel 54D provided on the movable shelf plate 54 along the facing direction D and guides the rolling of the drive wheel 54B and the driven wheel 54D.

The movable shelf plate 54 is provided movably with respect to the body 50 and supports the article 10. The movable shelf plates 54 face each other in the facing direction D across the area S, and seven movable shelf plates are arranged in the vertical direction. That is, one storage part 51 can store 28 articles 10 each (56 articles in total) with the area S interposed therebetween. In the present preferred embodiment, four such storage parts 51 are arranged along the extending direction of the track 4, for example.

The movable shelf plate 54 of the present preferred embodiment includes a body plate 54A and has a size capable of supporting four articles 10. The movable shelf plate 54 is provided with the drive wheel 54B and a driven wheel 54D and is provided to be able to roll the guide part 52. The drive part 54C is a drive source of the drive wheel 54B, and is, for example, a motor. The drive part 54C moves the movable shelf plate 54 along the extending direction of the guide part 52. The drive part 54C of the present preferred embodiment is provided on the body plate 54A. The drive part 54C is driven by a drive control device 54E. The drive control device 54E controls the driving of the drive part 54C. The drive control device 54E is provided on the body plate 54A.

In the present preferred embodiment, with the drive part 54C and the drive control device 54E being provided on the body plate 54A of the movable shelf plate 54, when the drive part 54C is driven, the movable shelf plate 54, the drive part 54C, and the drive control device 54E move integrally. In other words, the movable shelf plate 54, the drive part 54C, and the drive control device 54E are configured as one unit (a movable shelf plate unit). The movable shelf plate 54 is detachable from the body 50. That is, the movable shelf plate unit is detachable from the body 50. When removing the movable shelf plate unit from the body 50, the power line and the communication line connected to the drive part 54C and the drive control device 54E may be removed from the body 50, and a body plate 54A may be removed.

The guide parts 52, 52 facing each other in the pair of storage parts 51, 51 are connected by a connection part 53 in the area S. The connection part 53 extends in the facing direction D of the pair of storage parts 51, 51 and guides the movement of the movable shelf plate 54 to the area S. Similarly to the guide part 52, the connection part 53 includes rolling surfaces of the drive wheel 54B and the driven wheel 54D provided on the movable shelf plate 54 along the facing direction D and guides the rolling of the drive wheel 54B and the driven wheel 54D.

The connection part 53 includes a rolling surface that is flush with both the rolling surface of one guide part 52 of the guide parts 52, 52 facing each other and includes a rolling surface that is flush with the rolling surface of the other guide part 52. With such a configuration, the connection part 53 can be extended from both of the movable shelf plate 54 disposed in one of the pair of storage parts 51, 51 and the movable shelf plate 54 disposed in the other of the pair of storage parts 51, 51. That is, the connection part 53 has both a function of guiding the movement of the movable shelf plate 54 in one of the pair of storage parts 51, 51 to the area S and a function of guiding the movement of the movable shelf plate 54 in the other of the pair of storage parts 51, 51 to the area S.

The connection part 53 is retractable from the area S. Specifically, the connection part 53 is detachable from the guide parts 52, 52 facing each other. The guide parts 52, 52 and the connection part 53 are connected by an appropriate method. The guide parts 52, 52 and the connection part 53 may be connected by a fastening member such as a bolt or may be connected by fitting the guide parts 52, 52 and the connection part 53 to each other.

Figure 7A:
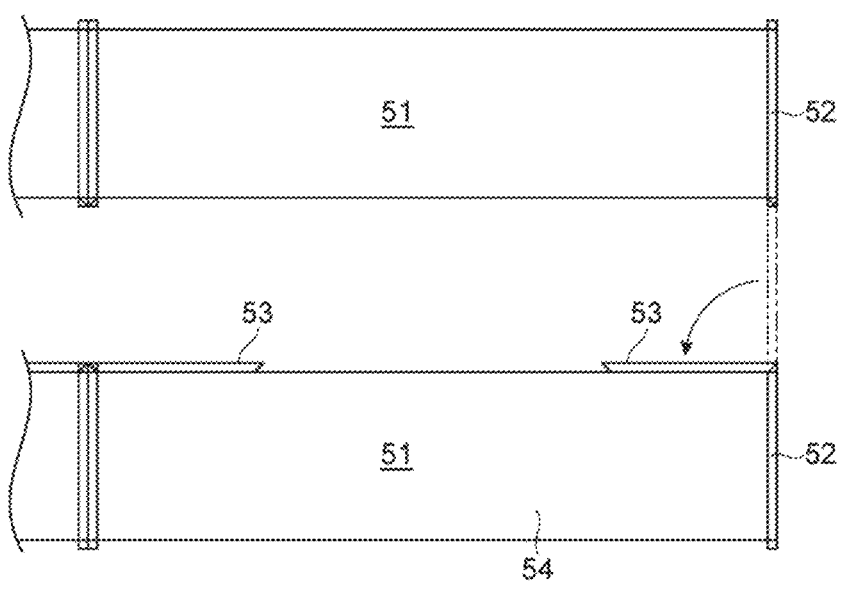
FIG. 7A is a plan view illustrating a guide part and a connection part.
Figure 7B:
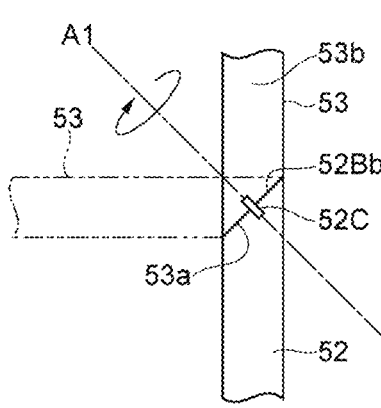
FIG. 7B is a plan view illustrating the guide part and the connection part in a connected state.
Figure 7C:
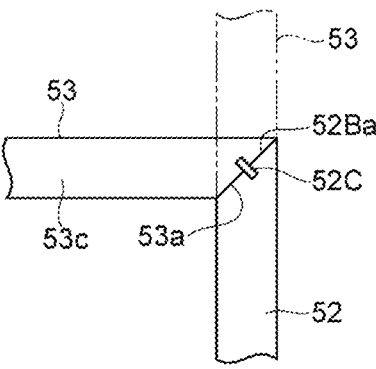
FIG. 7C is a plan view illustrating the guide part and the connection part in a retracted state.

The connection part 53 may be detachable from one guide part 52 of the guide parts 52, 52 facing each other and may be bendable with respect to the other guide part 52. Specifically, as illustrated in FIG. 7A, the connection part 53 comes into the state of being retracted from the area S when the connection part 53 is bent with respect to the other guide part 52 (the connection part 53 indicated by a solid line) from a state where the guide parts 52, 52 are connected to each other. More specifically, as illustrated in FIGS. 7B and 7C, an inclined surface 52Ba is located at the end of the guide part 52. Similarly, an inclined surface 53a is located at the end of the connection part 53. The connection part 53 is provided so as to be rotatable about a rotation axis μl orthogonal to the inclined surfaces 52Ba, 53a in a state where the inclined surface 52Ba of the guide part 52 and the inclined surface 53a of the connection part 53 face each other via a rotation member 52C.

In order to change the state of the connection part 53 from the connected state to the retracted state, the connection between the one guide part 52 and the connection part 53 is released, and the connecting portion between the other guide part 52 and the connection part 53 is rotated about the rotation axis μl. This can change the state from the connected state (cf. FIG. 7B) in which the extending direction of the guide part 52 and the extending direction of the connection part 53 coincide with each other to the retracted state (cf. FIG. 7C) in which the extending direction of the guide part 52 and the extending direction of the connection part 53 are orthogonal to each other.

Figure 8:
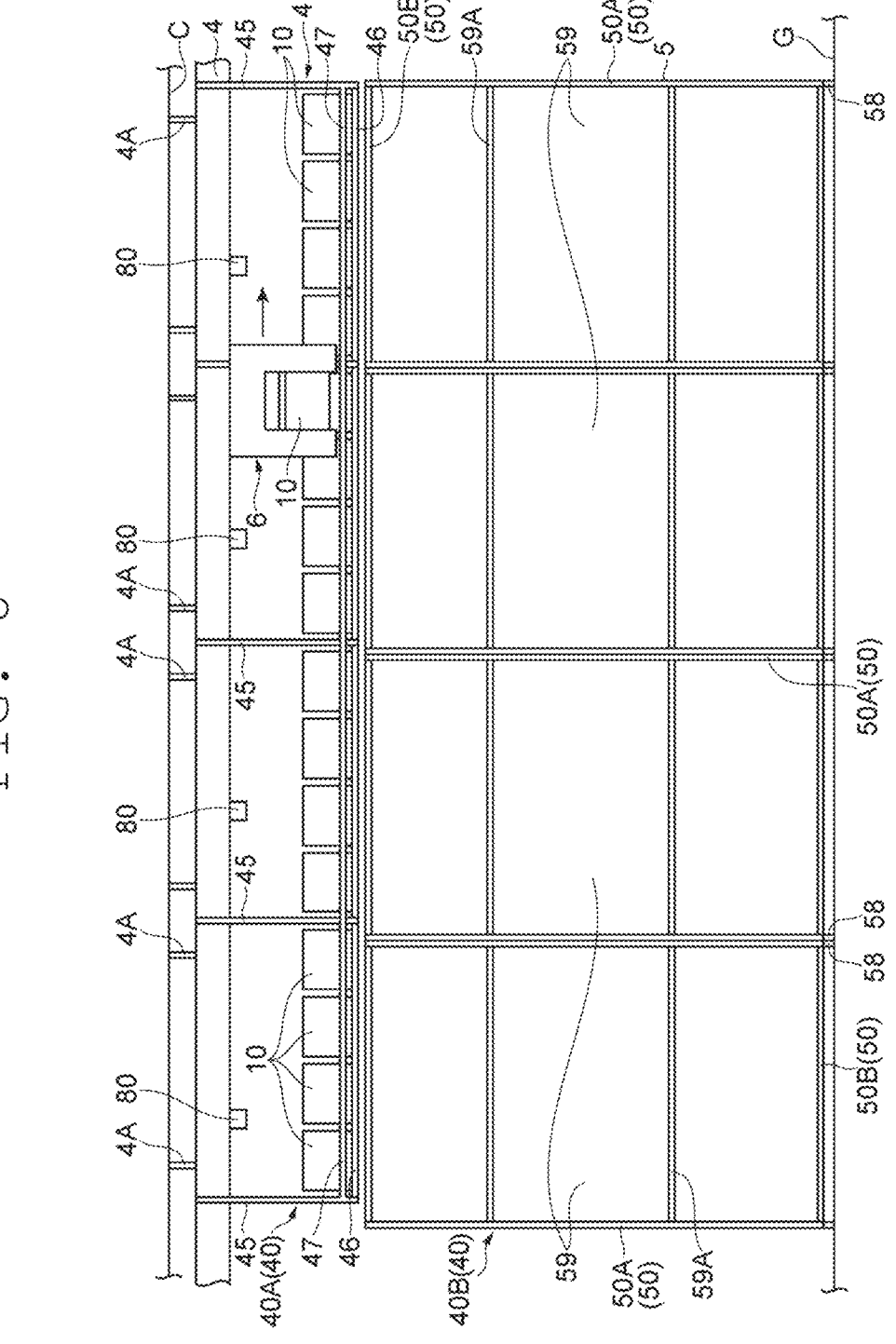
FIG. 8 is a front view of the first storage shelf in FIG. 1 and the second storage shelf to which a body panel is attached as viewed from the front.
Figure 9:
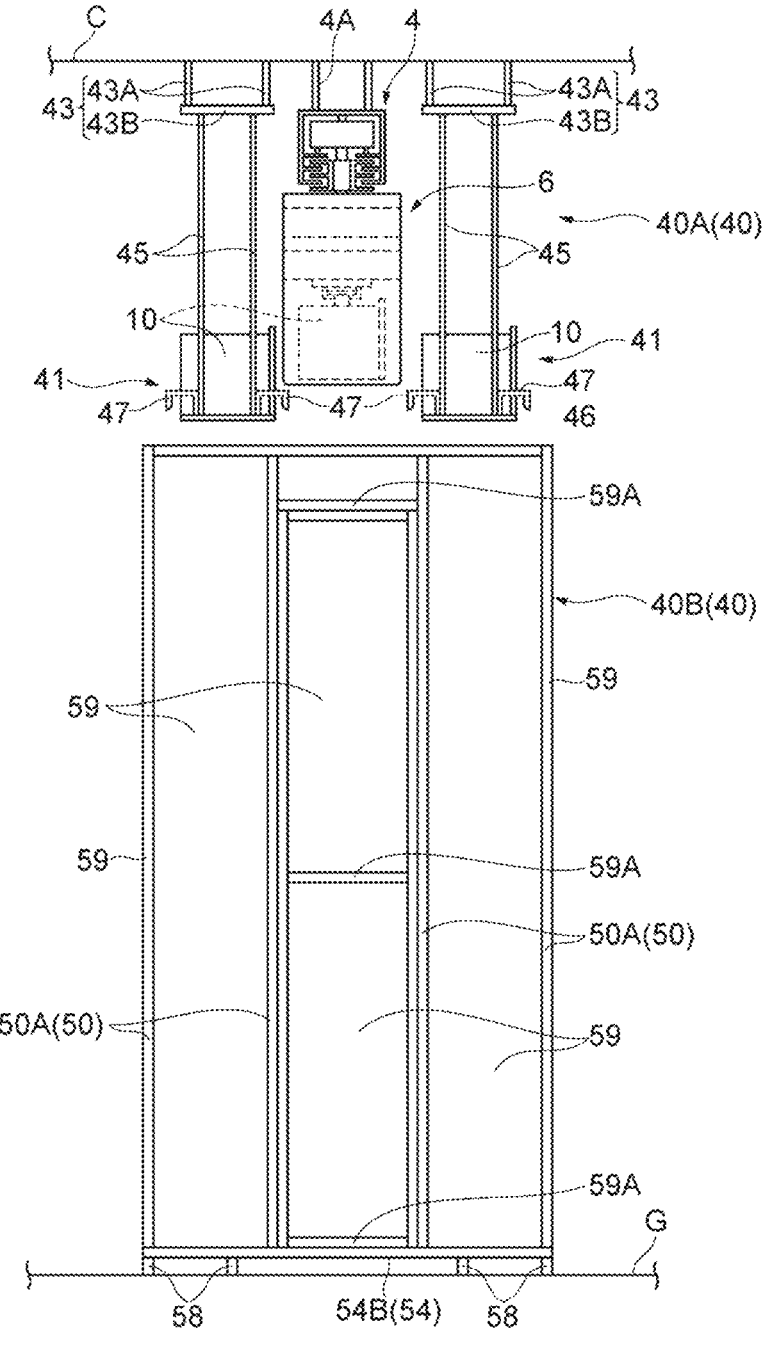
FIG. 9 is a side view of the first storage shelf in FIG. 1 and the second storage shelf to which a body panel is attached as viewed from the side.

As illustrated in FIGS. 8 and 9, the body panel 59 is attached to the body 50 so as to surround the body 50. More specifically, the body panel 59 is attached to the column 50A, the frame 50B, and a reinforcing member 59A provided to attach the body panel 59 by an appropriate method. For example, the body panel 59 may be attached to the body 50 by being fitted into a frame body including the column 50A, the frame 50B, and the body panel 59 or may be attached to the column 50A, the frame 50B, and the body panel 59 with bolts or the like.

Figure 10:
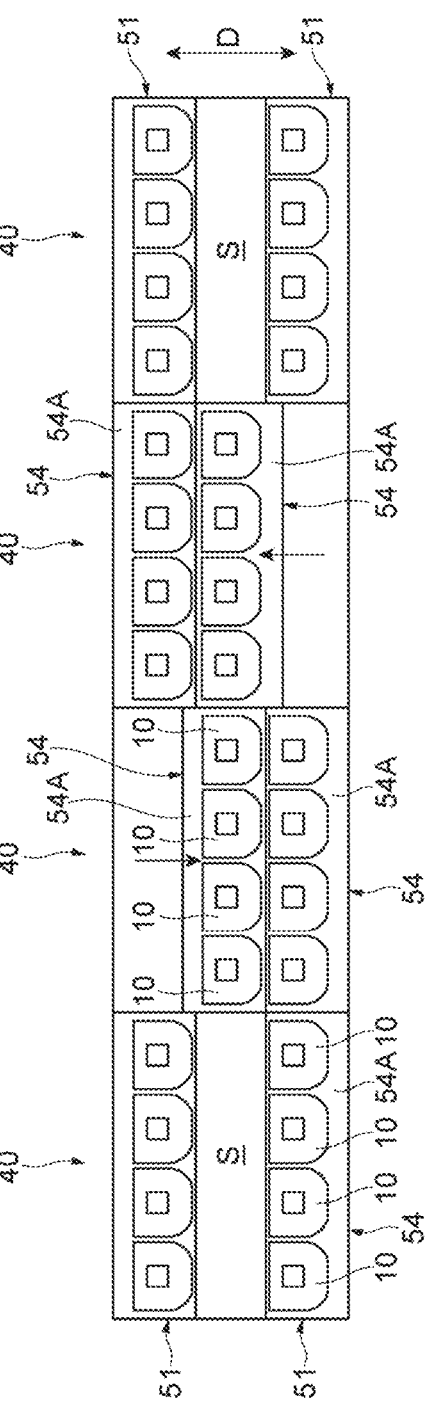
FIG. 10 is a plan view illustrating the second storage shelf when the movable shelf plate is in an advanced state.

The transfer from the transport vehicle 6 to the second storage shelf 40B as described above is performed by advancing (cf. FIG. 10) the movable shelf plate 54 including the placement position of the transport destination or the transport source to the area S by a command from the transport vehicle 6, and then lifting and lowering the lift stage 30. A configuration enabling such control will be described below.

As illustrated in FIGS. 2 and 3, the transport vehicle 6 includes a first communication part 37 (cf. FIG. 2) that enables communication with the second storage shelf 40B. The second storage shelf 40B includes a second communication part 80 that enables communication with the overhead transport vehicle 6. The second communication part 80 is, for example, an E84 sensor able to communicate only with the first communication part 37 of the transport vehicle 6 stopped at a predetermined position. In other words, the second communication part 80 provided in the second storage shelf 40B can communicate only with the first communication part 37 of the transport vehicle 6 stopped above the second storage shelf 40B provided with the second communication part 80.

When the article 10 is transferred from the transport vehicle 6 to the second storage shelf 40B in such a configuration, the transport vehicle 6 moves to a destination (a predetermined second storage shelf 40B including the storage part 51 of the transport destination) and stops based on a transport command transmitted from a controller (not illustrated) that controls the plurality of transport vehicles 6 constituting the transport vehicle system 1. Next, based on the transport command, the first communication part 37 transmits an identification signal to identify one movable shelf plate 54 including the storage part 51 of the transport destination. When receiving the identification signal via the second communication part 80, the drive control device 54E controls the drive part 54C corresponding to the one movable shelf plate 54 so that the movable shelf plate 54 identified by the identification signal advances to the area S. The transport vehicle 6 moves the lift stage 30 up and down with respect to the movable shelf plate 54 that has advanced to the area S to transfer the article 10.

Functions and effects in the second storage shelf 40B and the transport vehicle system 1 of the above preferred embodiment will be described. In the second storage shelf 40B of the above preferred embodiment, the guide parts 52, 52 facing each other in the pair of storage parts 51, 51 are connected by a connection part 53 in the area S. As a result, the pair of storage parts 51, 51 support each other via the guide part 52, and hence it is possible to reduce the amount of deflection that occurs when the movable shelf plate 54 advances from the storage part 51 as compared with a configuration in which the movable shelf plate 54 advances from the storage part 51 in a cantilevered manner.

In the second storage shelf 40B of the above preferred embodiment, the drive part 54C and the drive control device 54E may be provided on the movable shelf plate 54, and the movable shelf plate 54 may be provided to be detachable from the body 50. That is, in the above preferred embodiment, the movable shelf plate 54, the drive part 54C, and the drive control device 54E are integrally configured as one unit. As a result, for example, when the drive part 54C or the drive control device 54E fails, it is possible to repair the defective movable shelf plate 54 by a simple work of removing the movable shelf plate 54 to which the failed drive part 54C or drive control device 54E is attached from the body 50 and attaching a new movable shelf plate 54 with a normal drive part 54C and drive control device 54E to the body 50.

In the second storage shelf 40B of the above preferred embodiment, the connection part 53 is retractable from the area S. Thus, although it is difficult for an operator to freely move in the area S because the connection part 53 is disposed in the area S under normal use, with this configuration, the connection part 53 in the area S can be removed. Thus, by removing the connection part 53 from the guide part 52, the operator can freely move the area S.

The second storage shelf 40B of the above preferred embodiment is provided with the first storage shelf 40A having the hung part 45 hung from the ceiling C of the building and the fixed shelf plate 46 immovably attached to the hung part 45. Meanwhile, the second storage shelf 40B has the legs 58 to support the body 50 on the floor surface G of the building and is disposed below the first storage shelf 40A. As a result, the article 10 can be selectively placed on two types of placement places, the fixed shelf plate 46 and the movable shelf plate 54, according to the situation.

In the transport vehicle system 1 of the above preferred embodiment, when the article 10 is transferred from the transport vehicle 6 to the movable shelf plate 54 in the state of being advanced to the area S (cf. FIG. 10), the bending of the second storage shelf 40B is reduced, so that the article 10 can be reliably transferred from the transport vehicle 6.

In the transport vehicle system 1 of the above preferred embodiment, when an identification signal to identify one movable shelf plate 54 is transmitted from the first communication part 37 included in the transport vehicle 6, and the drive control device 54E receives the identification signal via the second communication part 80 included in the second storage shelf 40B, the drive control device 54E controls the drive part 54C corresponding to the identified movable shelf plate 54 so that the movable shelf plate 54 identified by the identification signal advances to the area S. With this configuration, the movable shelf plate 54 can be moved by communication between the transport vehicle 6 and the second storage shelf 40B without the need for the host controller.

In the transport vehicle system 1 of the above preferred embodiment, the transport vehicle 6 includes the lateral transfer part 24 that transfers the article 10 in the direction (a horizontal direction) intersecting the vertical direction. Therefore, when the fixed shelf plate 46 is provided, the article 10 can be placed only by laterally transferring the article 10. The transfer to the movable shelf plate 54 is performed by the specific movable shelf plate 54 advancing to the area S and the lift stage 30 descending under the control of the drive control device 54E after communication is performed between the transport vehicle 6 and the second storage shelf 40B. However, the transfer to the fixed shelf plate 46 can be performed in a relatively short time because the communication and the advancement of the shelf plate are unnecessary. Therefore, the fixed shelf plate 46 can be selected when it is desired to complete the transfer operation of the article 10 in a short time or when it is desired to quickly take out the article 10, for example, when an article scheduled to be immediately moved to another place is placed or when there are many following vehicles.

Preferred embodiments of the present invention have been described above, but the present invention is not limited to the above preferred embodiments. Various modifications can be made in a range not departing from the gist of the present invention.

Alternative Preferred Embodiment 1

Figure 11:
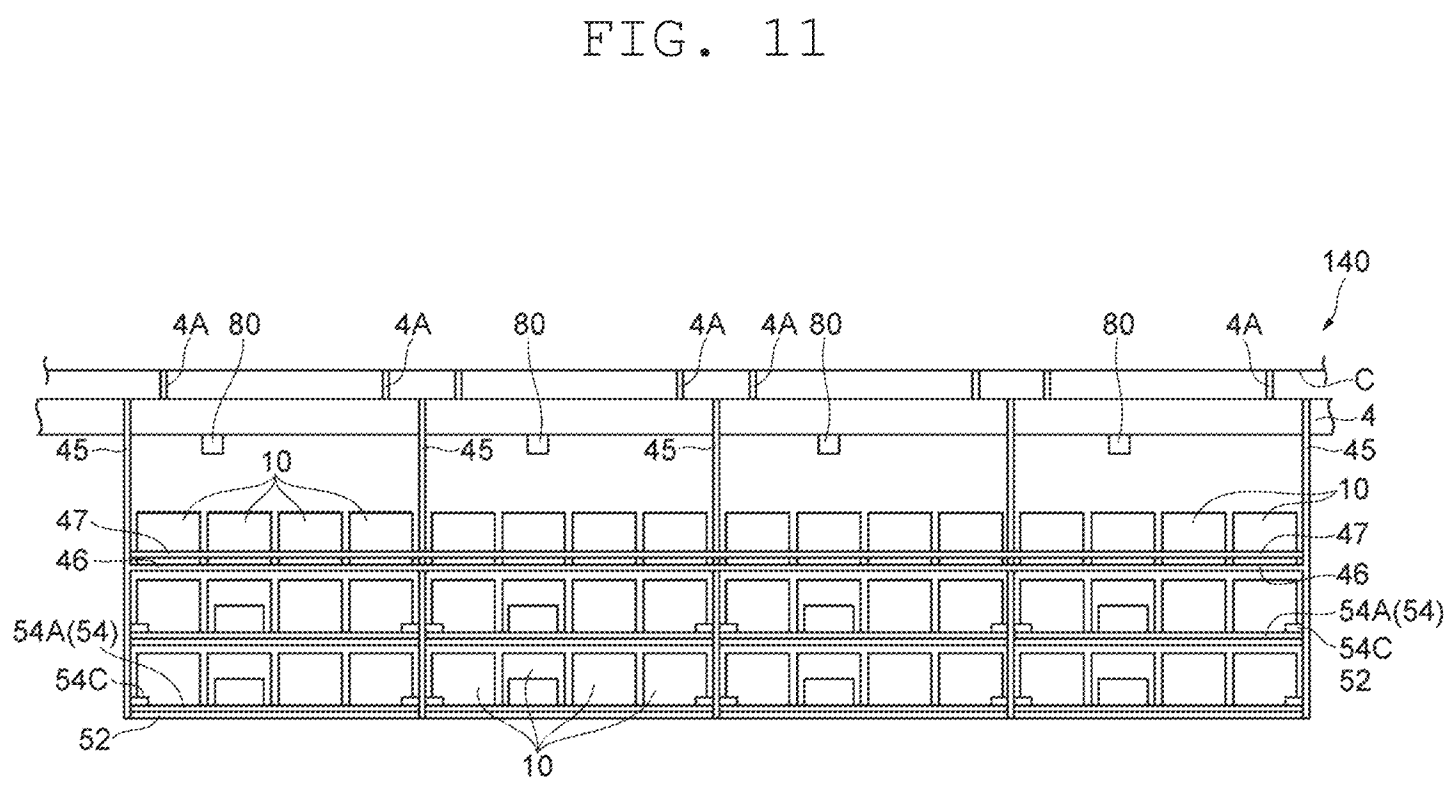
Figure 12:
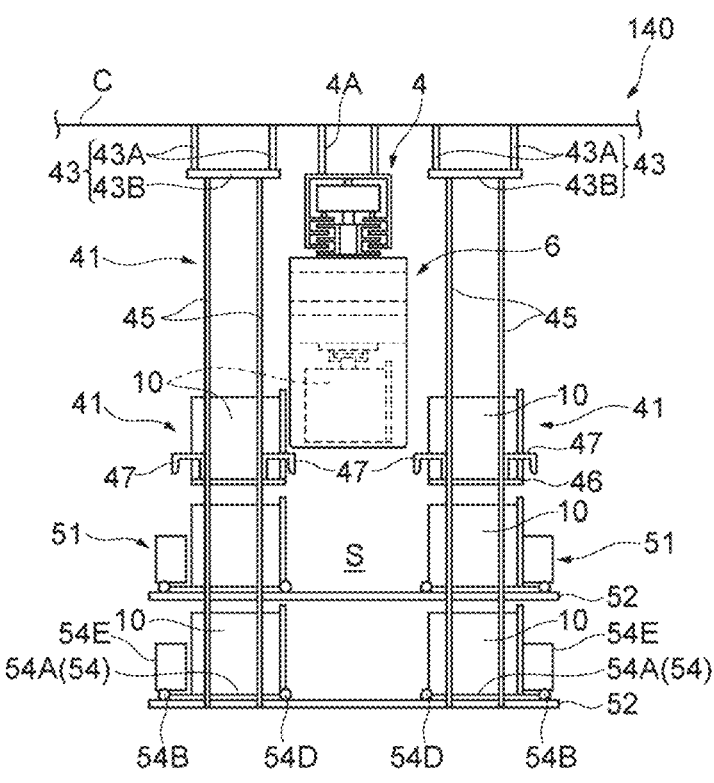
FIG. 12 is a side view of the storage shelf according to Alternative Preferred Embodiment 1 of the present invention as viewed from the side.

In the transport vehicle systems 1 of the above preferred embodiments, an example has been described in which the fixed shelf plate 46 is part of the first storage shelf 40A hung and installed on the ceiling C, and the movable shelf plate 54 is part of the second storage shelf 40B set on the floor surface G, but the present invention is not limited thereto. For example, in the transport vehicle system 1 according to Alternative Preferred Embodiment 1, as illustrated in FIGS. 11 and 12, both the movable shelf plate 54 and the fixed shelf plate 46 may be provided on a storage shelf 140 hung from the ceiling C of the building. Note that the configuration of the storage part 51 provided with the movable shelf plate 54 is the same as the configuration of the above preferred embodiment. The movable shelf plate 54 is below the fixed shelf plate 46.

Even with the configuration of the storage shelf 140 included in the transport vehicle system 1 according to Alternative Preferred Embodiment 1 as described above, it is possible to increase the number of articles 10 stored and to reduce the amount of deflection that occurs when the movable shelf plate 54 advances from the storage part 51. The storage shelf 140 of Alternative Preferred Embodiment 1 has a simple configuration, so that it is possible to manufacture the storage shelf at low cost and it is easy to assemble the storage shelf. Moreover, there is no need to install the storage shelf 140 on the floor surface G, thus widening an area where the operator can freely move and improving workability.

Alternative Preferred Embodiment 2

Figure 13:
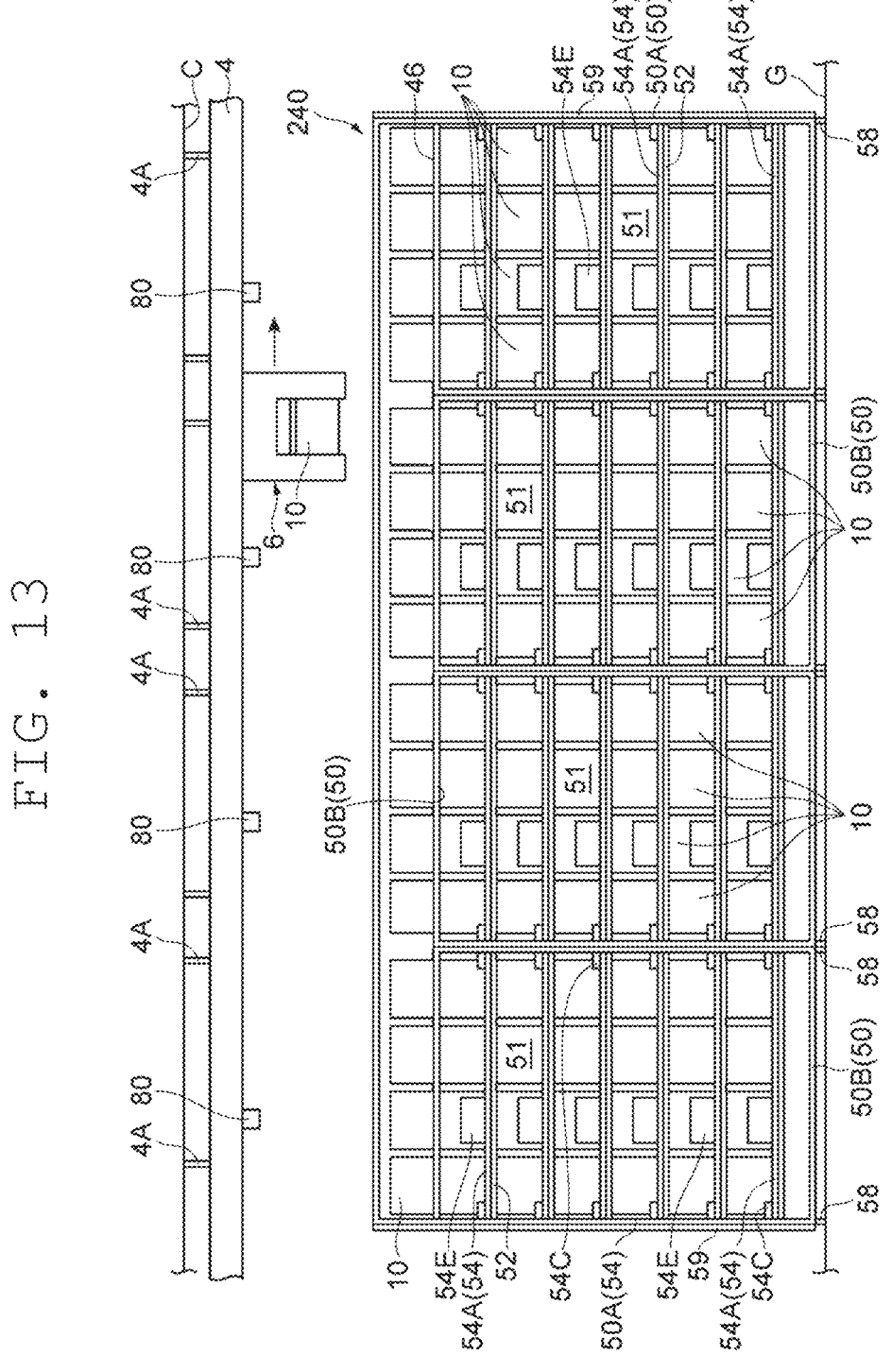
FIG. 13 is a front view of a storage shelf according to Alternative Preferred Embodiment 2 as viewed from the front.
Figure 14:
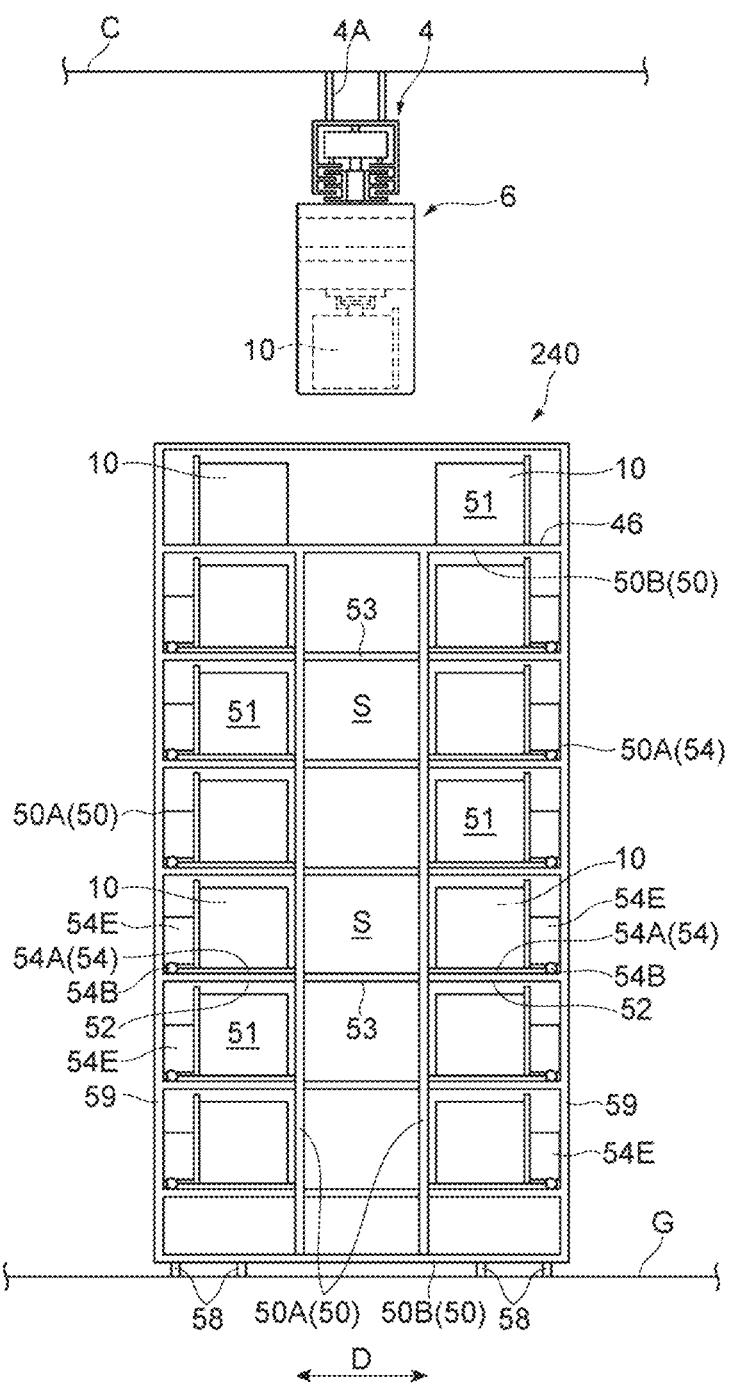
FIG. 14 is a side view of the storage shelf according to Alternative Preferred Embodiment 2 of the present invention as viewed from the side.

For example, in the transport vehicle system 1, as illustrated in FIGS. 13 and 14, both the movable shelf plate 54 and the fixed shelf plate 46 may be provided on a storage shelf 240 set on the floor surface G. The body panel 59 attached so as to surround the side of the frame 50B and the body 50 in the storage shelf 240 of Alternative Embodiment 2 also surrounds the side of the fixed shelf plate 46, and an opening to allow the transfer of the article 10 by the transport vehicle 6 is provided above the fixed shelf plate 46. Note that the configuration of the storage part 51 provided with the movable shelf plate 54 is the same as the configuration of the above preferred embodiment. The movable shelf plate 54 is disposed below the fixed shelf plate 46. In addition, although not illustrated, all the shelf plates of the storage part 51 of the storage shelf 240 may be the movable shelf plate 54.

Even with the configuration of the storage shelf 240 included in the transport vehicle system 1 according to Alternative Preferred Embodiment 2 as described above, it is possible to increase the number of articles 10 stored and to reduce the amount of deflection that occurs when the movable shelf plate 54 advances from the storage part 51. With the configuration of the storage shelf 240 of Alternative Preferred Embodiment 2, the storage shelf 240 can be supported stably. For example, the storage shelf 240 assembled in a factory or the like can be taken to a site where the storage shelf 240 is to be installed and installed as it is. This makes it possible to reduce or minimize work on site at the time of installation.

In the above preferred embodiments, examples in which seven movable shelf plates 54 are arranged in the vertical direction have been described, but the number of movable shelf plates 54 is not limited to such a number, and the number of movable shelf plates 54 arranged may be less than seven, or eight or more.

In the above preferred embodiments, examples in which the movable shelf plate 54 supports four articles 10 for one body plate 54A have been described, but the number of articles is not limited to such a number, and the number of articles may be less than four, or five or more.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transport vehicle system comprising:
an overhead transport vehicle to travel along a rail; and
a storage shelf to which an article is transferrable by the overhead transport vehicle traveling along the rail; wherein
the storage shelf includes:
a body; and
a pair of storage portions in the body and facing each other across a predetermined area in a plan view as viewed from above in a vertical direction;
each of the pair of storage portions includes:
a movable shelf plate that is movable with respect to the body and capable of supporting the article;
a guide extending in a facing direction of the pair of storage portions to guide movement of the movable shelf plate;
a driver to move the movable shelf plate along an extending direction of the guide; and
a drive controller to control the driver;
the guides facing each other in the pair of the storage portions are connected by a connector in the area to guide the movement of the movable shelf plate to the area;
the overhead transport vehicle further includes a first communicator to perform communication with the storage shelf;
the storage shelf further includes a second communicator to perform communication with the overhead transport vehicle;
the first communicator is operable to transmit an identification signal to identify one of the movable shelf plates; and
when receiving the identification signal via the second communicator, the drive controller is configured or programmed to control the driver corresponding to the movable shelf plate identified so that the movable shelf plate identified by the identification signal advances to the area.

2. The transport vehicle system according to claim 1, wherein
the driver and the drive controller are provided on the movable shelf plate; and
the movable shelf plate is detachable from the body.

3. The transport vehicle system according to claim 1, wherein the connector is retractable from the area.

4. The transport vehicle system according to claim 1, further comprising:
a hung storage portion including a hung portion hung from a ceiling of a building in which the storage shelf is installed, and a fixed shelf plate immovably attached to the hung portion; and
a leg to support the body on a floor surface of the building; wherein
the storage portions are below the hung storage portion.

5. The transport vehicle system according to claim 4, wherein:
the overhead transport vehicle further includes a transfer mechanism to transfer the article in a direction intersecting the vertical direction;

when the overhead transport vehicle transfers the article to the fixed shelf plate, the overhead transport vehicle is operable to transfer the article in a direction intersecting the vertical direction by the transfer mechanism without transmitting an identification signal to identify one of the movable shelf plates from the first communicator; and when the overhead transport vehicle transfers the article to the movable shelf plate, the drive controller is configured or programmed to receive the identification signal transmitted from the first communicator via the second communicator and transfer the article to the movable shelf plate after the movable shelf plate identified from the identification signal is advanced to the area.

6. The transport vehicle system according to claim 1, further comprising, in the body, a hung portion to be hung from a ceiling of a building in which the storage shelf is installed; wherein the storage portion further includes a fixed shelf plate that is immovable with respect to the body and is capable of supporting the article; and the movable shelf plate is below the fixed shelf plate in the vertical direction.

7. The transport vehicle system according to claim 1, further comprising, in the body, a leg on a floor surface of a building on which the storage shelf is supported; wherein the storage portion further includes a fixed shelf plate that is immovable with respect to the body and capable of supporting the article; and the movable shelf plate is below the fixed shelf plate in the vertical direction.

8. The transport vehicle system according to claim 1, wherein the overhead transport vehicle includes a transfer mechanism to transfer the article in a direction intersecting the vertical direction.

* * * * *